United States Patent Office 3,319,124
Patented May 9, 1967

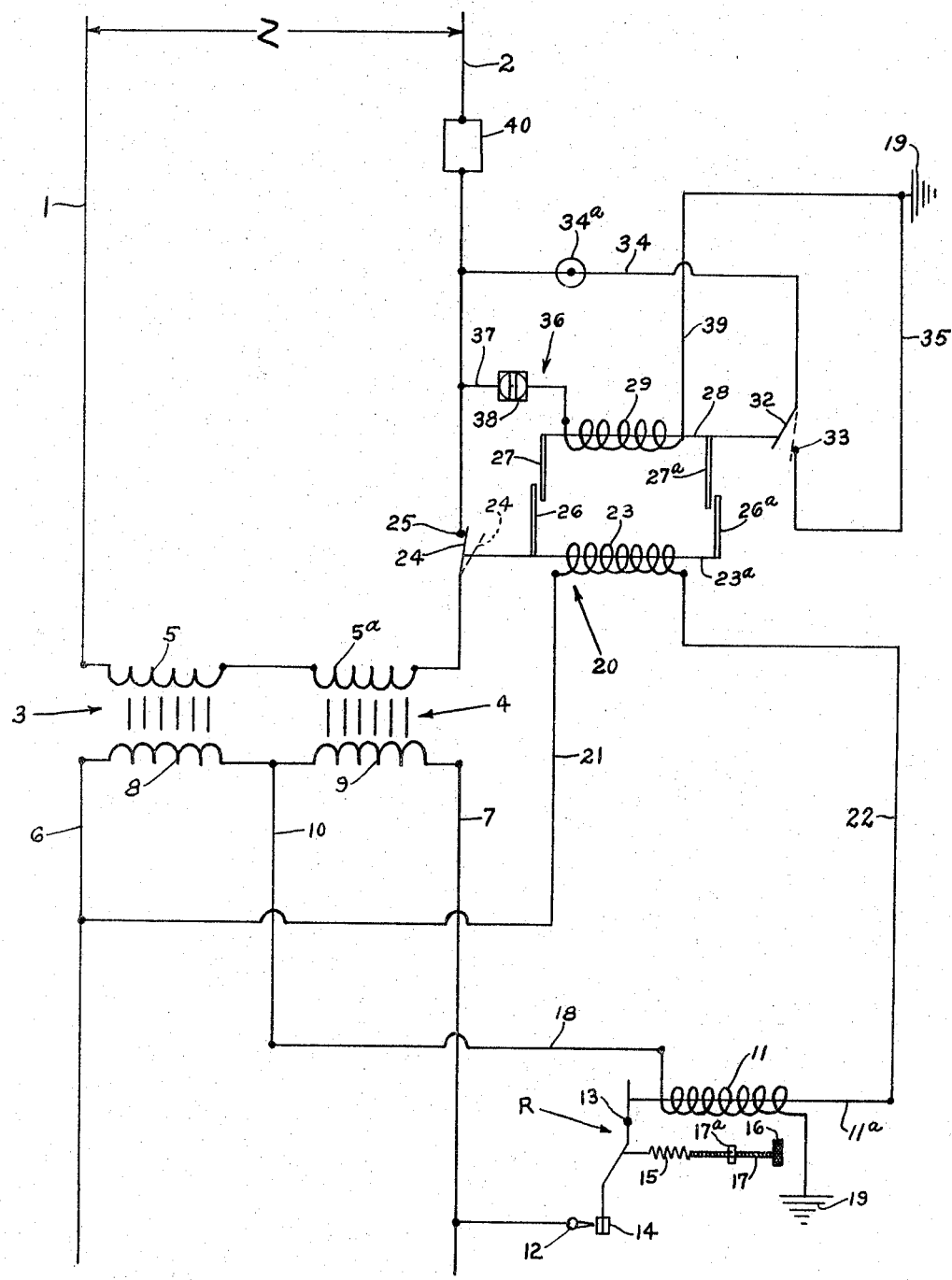

3,319,124
ELECTRICAL CIRCUIT PROTECTIVE APPARATUS
Joseph P. Marino, Lincoln, R.I., assignor to Electronic Instruments Corp., Lincoln, R.I., a corporation of Rhode Island
Filed Jan. 27, 1964, Ser. No. 340,367
4 Claims. (Cl. 317—18)

This invention relates to apparatus to control an electrical circuit.

One object of my invention is to provide improved apparatus that responds to an electrical fault to ground in an electrical system resulting from interruption of the normal supply of electrical current to power consuming means such as a tool.

Another object is to provide such apparatus that includes two transformers each having a primary winding and a secondary winding, and connecting a center or neutral wire to one of said secondary windings, said center wire being connected to relay apparatus and supplying current thereto only when an electrical fault to ground occurs, whereby this current actuates said relay apparatus to thereby disconnect the primary circuit.

Still another object is to provide an electrically-operated signal, such as an electric light, as part of disconnecting apparatus whereby warning of any fault to ground developing is signaled to an operator of a tool or the like and those nearby.

A further object is to provide manually operated reset apparatus forming part of disconnecting apparatus and which can be operated simply as by pushing a button, to thereby restore the primary circuit upon correction of any fault by effecting the closing of a switch.

A still further object is to provide such apparatus that is simple to construct, is certain in operation, and can be sold at a price within the range of those in need of it.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and therefore, I am not to be limited to the construction disclosed by the drawing, nor to the particular arrangement described in the specification; but am entitled to all such changes therefrom as fall within the scope of my claims.

The drawing is a diagrammatic view of my apparatus, including the electrical system, in normal position.

As illustrated, the usual electrical supply or primary leads 1 and 2 are connected to a source of electrical supply, not shown. An ordinary transformer 3 has a primary winding 5, and a saturable transformer 4 has a primary winding 5a that is connected in series with said primary winding 5. The core of transformer 4 will be moderately saturated over the range of applied voltages in supply leads or conductors 1 and 2 so that there will be constant voltage output in secondary or load leads 6 and 7 which are connected to secondary windings 8 and 9 of said transformers 3 and 4 respectively.

Said secondary windings 8 and 9 are connected to a neutral center tap lead 10 and are poled so as to oppose each other, and the saturable transformer 4 develops most of the secondary voltage.

When an applied alternating voltage amplitude varies across supply leads 1 and 2, as may occur when loads are either applied or removed from lines feeding supply leads 1 and 2, the division of voltage between the transformers 3 and 4 changes with the latter taking proportionately less of the total. The resultant secondary voltage in load leads 6 and 7 will become more nearly equal and voltage values in load leads 6 and 7 and center tap 10 will remain substantially constant over an appreciable range of voltages applied to supply leads 1 and 2.

A variable sensitive relay apparatus R includes coil 11 with plunger 11a, stationary contact element 12 connected to load lead 7, pivotal element 13 carrying contact member 14, and preferably mechanical tension spring 15 connected to pivotal element 13, and adjusting thumbscrew 16 attached on a screw-threaded member 17 connecting on a locking member 17a. The degree of tension desired on said spring 15 is effected by adjusting said member 17 in this well-known arrangement. Said coil 11 is connected by conductor 18 to center tap lead 10 and to ground 19. Said contacts 12 and 14 control the energizing current to a disconnecting relay coil 23 that is supplied by conductor 21 connected to load lead 6.

Should an imbalance in potential occur in either lead 6 or 7, due to an electrical fault occurring in power consuming means connected across leads 6 and 7, current will flow through center tap lead 10 to coil 11. The value of current passing through coil 11 is directly proportional to the amount of adjustment permitted to pivotal element 13. Tightening thumb screw 16 increases tension through tension spring 15 to said pivotal element 13 resulting, therefore, in an increase in current values in coil 11 necessary to close contact elements 14 and 12. This permits energizing current to flow through conductors 21 and 22 and thence to disconnecting relay coil 23 and thereby opening the supply circuit in a positive manner.

The general circuitry providing positive electromechanical disconnecting apparatus 20 can effect disconnecting of the supply leads 1 and 2, and preferably resetting thereof manually. This apparatus 20 has a coil 23 with plunger 23a, and a switch has a contact arm 24 attached to said plunger 23a, and also has a stationary contact 25, said contacts 24 and 25 normally being closed.

To provide a signal, such as an electric light, said coil plunger 23a, movable with said coil 23, is fixedly attached to lever arms 26 and 26a and opening movement thereof opens said contacts 24 and 25. Adjacent the latter arms are lever arms 27 and 27a which are moved by, and when, said lever arms 26 and 26a are moved. Movement of said lever arms 27 and 27a carry with them a plunger 28 fixedly attached thereto and accompanying a coil 29. A switch contact arm 32 is fixed to said plunger 28 and is normally in open position and adjacent a fixed contact member 33; but closing movement of said plunger 28 brings said contacts 32 and 33 together.

A conductor 34 is connected to a signal lamp 34a and to said contact arm 32 and to said supply lead 2. Another conductor 35 extends from fixed contact 33 to ground 19.

Reset apparatus 36 includes conductor 37 that is connected to supply lead 2, a reset spring button 38 connected to conductor 37 and which normally is open; but can be closed manually against spring pressure of the button. Conductor 37 continues from said button 38 to said coil 29 and from which a conductor 39 extends and continues to ground 19. When energized said coil 29 draws said plunger 26 to open position thus opening said contacts 32 and 33. This also results in drawing said plunger 23a to closed position thus closing said switch contacts 24 and 25.

A well-known thermal overload disconnect switch 40 in lead 2 will automatically disconnect my control apparatus from the supply source should an overload condition exist or other abnormality occur.

In operation, electrical current is supplied through supply leads or wires 1 and 2 to transformers 3 and 4, thence to secondary or load leads 6 and 7 and to power consuming apparatus, not shown. In the event of an electrical fault to ground developing, such as current flowing through a metal body of a power consuming tool, the electrical current also flows through secondary winding 9 of said transformer 4 to the center tap lead 10 and thence through conductor 18 to coil 11 and to ground 19. This will cause movement of plunger 11a and pivotal element 13 thus bringing contacts 12 and 14 together. Current also flows from said load lead 7 to said contacts 12 and 14 and through coil 11 and through conductor wire 22 and through lead wire 21 to thereby energize coil 23 and move plunger 23a to open position to thereby draw said switch contact arm 24 to open position and opening the circuit.

In the aforesaid movement said plunger 23a also draws said lever arm 26 towards said lever arm 27, carrying the latter and arms 26a and 27a. This movement of arm 27 to closed position causes said switch contact arm 32 to contact member 33. Said lever arm 27a serves to hold arm 26a, and consequently arm 26 in open position since arm 26a is blocked from returning to closed position by arm 27a when said switch arm 32 is closed.

In this position current flows through lead 2 and conductor 34 to illuminate said warning lamp 34a and through said switch contacts 32 and 33 which were previously closed mechanically by said lever movement. The flow of current through said load leads 6 and 7 will thus cease, disconnecting the tool or power consuming equipment in which the electrical fault developed.

When said fault has been remedied or otherwise attended to said reset button 38 is physically pressed to establish an electrical circuit through it and conductor 37, coil 29 and conductor 39 to ground 19. The plunger 28 of coil 29 will then draw said levers 27 and 27a towards lever 26 thus moving said plunger 23a which causes establishment of the normal working circuit by moving contact arm 24 into contact with contact 25, and also moving switch arm 32 away from contact member 33.

What I claim is:

1. Electrical circuit control apparatus comprising disconnecting apparatus connected in a main power circuit embodying a transformer having a first primary winding and a secondary winding, a saturable transformer having a primary winding connected to said first primary winding and a secondary winding, electrically operated actuating means connected to said transformer and adapted to actuate said disconnecting apparatus and to connect with said main circuit, said disconnecting apparatus embodying a first coil, a first plunger adapted to be actuated when said first coil is energized, means operably connected to said first plunger and adapted to hold it in predetermined position, lever means and a first switch having a movable contact arm and both fixedly attached to said first plunger and movable therewith to thereby open said switch contact arm, a second switch having a movable switch arm attached to said lever means and adapted to be moved thereby to closed position upon said movement of said lever means, conductor means connecting said second switch arm to said main power circuit and an electrically operated signal member connected to the latter conductor means.

2. Electrical circuit control apparatus comprising disconnecting apparatus connected in a main power circuit, electrically operated actuating means adapted to actuate said disconnecting apparatus and to connect with said main circuit, said disconnecting apparatus embodying a first coil, a first plunger adapted to be actuated when said first coil is energized, connecting means, and a first switch having a movable contact arm and both connected to said first plunger and movable therewith to thereby operate said switch contact arm, a second switch having a movable switch arm attached to said connecting means and adapted to be moved thereby to closed position upon closing movement of the latter, conductor means connecting said second switch to said main power circuit, manually operated reset apparatus embodying a coil, a second plunger adapted to be actuated when said latter coil is energized and connected to said connecting means and said second movable arm, a reset member electrically connected to said latter coil and to said second switch and normally in open position, conductor means connected to said main power circuit and to said reset member, and other conductor means connecting the latter to said switch, said second plunger being adapted to draw said switch movable arm to open position upon being energized when said reset member is moved to closed position.

3. Electrical circuit control apparatus comprising disconnecting apparatus connected in a main power circuit, electrically operated actuating means adapted to actuate said disconnecting apparatus and to connect with said main circuit, said disconnecting apparatus embodying a first coil, a first plunger adapted to be actuated when said first coil is energized, first lever means and a first switch having a movable contact arm and both fixedly attached to said first plunger and movable therewith to thereby open said switch contact arm, other lever means so positioned as to be moved by movement of said first lever means, a second switch having a movable switch arm attached to said other lever means and adapted to be moved thereby to closed position upon closing movement of said other lever means, conductor means connecting said second switch to said main power circuit, an electrically operated signal member connected to the latter conductor means, and reset apparatus embodying a second coil, a second plunger adapted to be actuated when said second coil is energized and connected to said second switch movable arm, a reset member electrically connected to said second coil and to said second switch and normally in open position, conductor means connected to said main power circuit and to said reset member and other conductor means connecting the latter to said second switch, said second plunger being adapted to draw said second switch movable arm to open position upon being energized when said reset member is moved to closed position and also to draw said other lever means to open position and thereby close said first switch.

4. Electrical circuit control apparatus comprising two transformers each embodying a primary winding connected in series and with a main power circuit, and a secondary winding, said secondary windings being poled and opposing each other, a center tap lead connected between the two said secondary windings, relay apparatus embodying a plunger, a switch operably connected to said plunger and to said center tap lead and normally open and adapted to be closed when said center tap is energized, means operably connected to said plunger and adapted to hold it in predetermined position, disconnecting apparatus connected to said relay apparatus and to a said transformer and embodying a switch connected in said main power circuit and normally being closed, and adapted to be opened when said relay apparatus is activated, and means, when energized, adapted to open said latter switch and thereby disconnect said transformers from said main power circuit.

References Cited by the Examiner

UNITED STATES PATENTS

| | | | |
|---|---|---|---|
| 2,844,765 | 7/1958 | Sosnoski | 317—18 |
| 2,999,189 | 9/1961 | Gerrard | 317—18 |
| 3,168,682 | 2/1965 | Moore et al. | 317—18 |
| 3,229,163 | 1/1966 | Rogers | 317—18 |

MILTON O. HIRSHFIELD, *Primary Examiner.*

R. V. LUPO, *Assistant Examiner.*